United States Patent [19]
Hozumi et al.
[11] 4,452,276
[45] Jun. 5, 1984

[54] ACCUMULATOR FOR PNEUMATIC OR HYDRAULIC DEVICES

[75] Inventors: Norimi Hozumi; Nobuyuki Nakajima, both of Higashi-Matsuyama, Japan
[73] Assignee: Diesel Kiki Co., Ltd., Tokyo, Japan

[21] Appl. No.: 490,157
[22] Filed: Apr. 29, 1983
[30] Foreign Application Priority Data
May 11, 1982 [JP] Japan ............................ 57-68501[U]
[51] Int. Cl.³ ............................................ F16L 55/04
[52] U.S. Cl. ..................................................... 138/30
[58] Field of Search .................. 138/26, 30; 220/85 B

[56] References Cited

U.S. PATENT DOCUMENTS 3,035,614 5/1962 Kirk ...................................... 138/30
3,165,229 1/1965 Paul ...................................... 138/30
3,236,411 2/1966 Londer et al. .................... 138/30 X
3,983,902 10/1976 Lord ...................................... 138/30
4,010,773 3/1977 Bihlmaier .............................. 138/30
4,234,016 11/1980 Horino ................................. 138/30
4,321,949 3/1982 Mercier ................................ 138/30

FOREIGN PATENT DOCUMENTS 2242942 3/1974 Fed. Rep. of Germany ........ 138/30

*Primary Examiner*—James E. Bryant, III
*Attorney, Agent, or Firm*—Wenderoth, Lind & Ponack

[57] ABSTRACT

An accumulator for pneumatic or hydraulic devices which comprises a first casing, a second casing welded thereto, and a diaphragm received and supported in the two casings. The first casing is cylindrical and includes an inwardly stepped portion and an inwardly directed projection, whereas the second casing is of bowl shape. The diaphragm is flexible and cylindrical and has an open end having a connector gripped between the stepped portion and the projection of the first casing, the connector being positioned remotely from the integral joint where the first and second casings are welded together.

5 Claims, 3 Drawing Figures

ACCUMULATOR FOR PNEUMATIC OR HYDRAULIC DEVICES

BACKGROUND OF THE INVENTION

1. Field of the Invention

This invention relates to accumulators, and more particularly to such an accumulator for use with pneumatically or hydraulically-actuating devices.

2. Description of the Prior Art

Numerous accumulators of the type described above have been heretofore proposed in the field. A typical prior art accumulator, as shown in FIG. 1, comprises a generally cylindrical main body 1 closed at a bottom end and open at a top end 1*a* and constituted of a peripheral side wall, and a diaphragm 2 made of flexible material such as rubber and affixed to the inside of the body 1. The diaphragm 2 includes a peripheral side wall interiorly defining a generally cylindrical chamber, and a connector 3 on the circumference of which a spring-acting ring 4 is mounted. Located peripherally of the connector 3 is an outwardly protruded portion 5 arranged for abutting engagement, by means of the action of the ring 4, with a recessed portion 6 formed inwardly peripherally of the body 1 and adjacent to the open end 1*a*.

Designated at 7 is a cover mounted over the full surface of the open end 1*a* and secured to the body 1 at their respective joining edges by a lap joint 30 after the diaphragm 2 has been engaged with the body 1. The body 1 is also provided centrally of the cover 7 with an adapter 8 for introducing a gas into the diaphragm chamber, which adapter is closable with a plug 9. To the body is further attached a coupler 10 engageable with a pneumatic or hydraulic device.

However, this conventional accumulator has a drawback in that the formation of the lap joint 30 and also the inward recess requires tedious and time-consuming machining. Another, yet major, drawback is that since the connection of the diaphragm 2 is necessarily positioned adjacent to the lap joint 30 where welding W is effected, the diaphragm 2 per se is prone to deteriorate or degrade due to heat applied during the welding operation which would often in turn result in reduced performance and durability.

Accordingly, from the economic and practical points of view, such a prior art accumulator is totally unsatisfactory in industrial situations.

SUMMARY OF THE INVENTION

It is one object of the present invention to provide an improved accumulator which is relatively simple in construction and ensures easy interconnection of a diaphragm.

Another object of the invention is to provide an accumulator of the type referred to above which can dispense with recess machining as is necessitated in the conventional design and hence is less costly to make.

A further object of the invention is to provide an accumulator of the type referred to above which enables a diaphragm connector to be fitted at a position substantially remote from the position in which first and second casings are welded together, thereby protecting the diaphragm against function failures by heat during the welding operation.

These and other objects of the invention as will hereinafter become more readily apparent have been achieved by providing an accumulator for pneumatic or hydraulic devices which comprises: (a) a first casing having a generally cylindrical shape closed at one or bottom end and open at the other or top end and including a peripheral side wall, the side wall being composed of an inwardly stepped portion disposed adjacent to the bottom end, and a perpendicular portion extending from the outward end of the stepped portion and having a straight tip end and further having an inwardly directed projection interconnected between the stepped portion and the perpendicular portion; (b) a second casing integral with the first casing and having a generally in downwardly tapered shape closed at one or bottom end and open at the other or top end, the second casing being composed of a peripheral side wall having an outwardly projected distal end and an abutment arranged inwardly of the distal end for face-to-face engagement with said tip end of the first casing; (c) a diaphragm made of flexible material and closed at one or bottom end and open at the other or top end and composed of a peripheral side wall interiorly defining a generally cylindrical chamber, the diaphragm further including a connector mounted peripherally of the open end and supported in the first casing with said connector gripped between said stepped portion and said inward projection thereof; and (d) means for welding together the tip and distal ends of the first and second casings.

BRIEF DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENT

Figure 1:
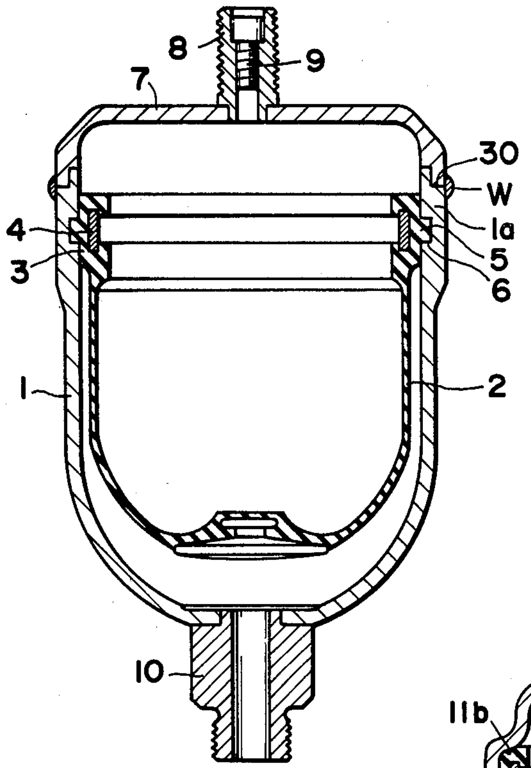
FIG. 1 PRIOR ART
FIG. 1 is a vertical cross-sectional view of a prior art accumulator for comparative purposes.
Figure 2:
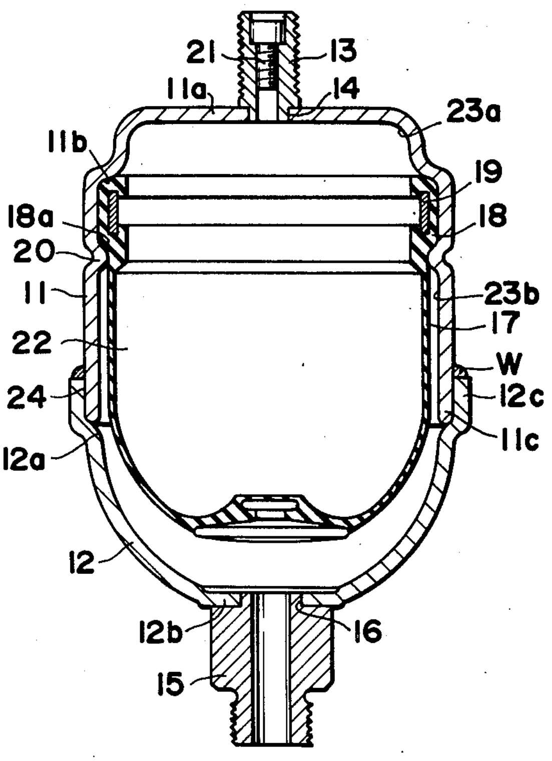
FIG. 2 is a vertical cross-sectional view of an accumulator embodying the invention and in complete assembly.
Figure 3:
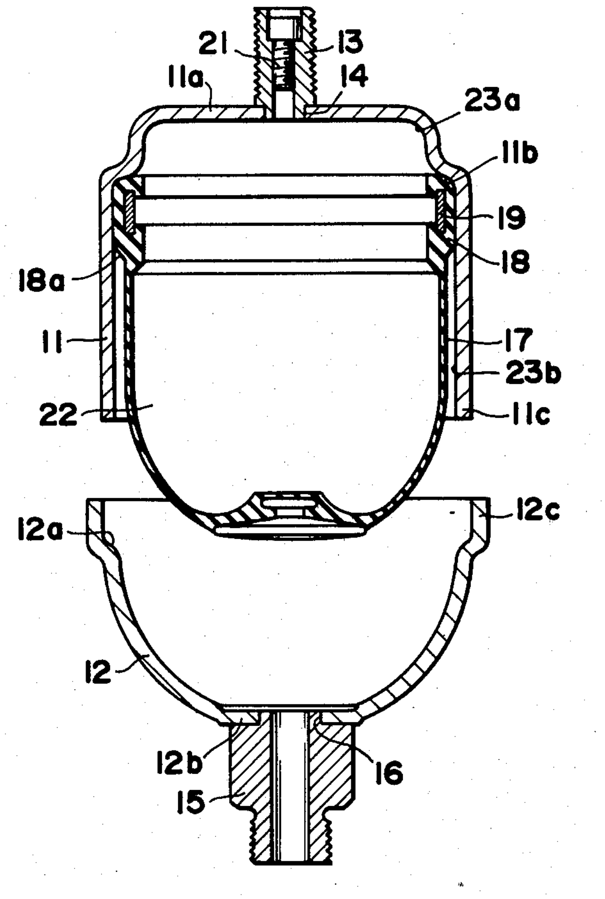
FIG. 3 is a view similar to FIG. 2, but showing the accumulator in temporary assembly, i.e., the manner in which a first casing having a diaphragm interfitted therewith and a second casing are joined together.

Referring to the drawings and FIG. 2 in particular, there is shown an accumulator which embodies the present invention. The accumulator broadly comprises a first casing 1, a second casing 12 welded thereto longitudinally below the first casing, and a diaphragm 17 supported in the first casing and also accommodated in the second casing, casing 11 and 12 and diagram 17 each being symmetrically about a longitudinally extending center axis (not illustrated in the drawings). The first casing 11 is so structured as to be closed at one or bottom end 11*a* and open at the other or top end and to have a peripheral side wall in which is defined a generally cylindrical chamber 22. The side wall includes a constricted portion 23*a* connected to the bottom end 11*a*, an inwardly stepped portion 11*b* extending from the constricted portion 23*a*, and a perpendicular portion 23*b* standing from the stepped portion 11*b* and having a straight tip end 11*c*. Formed centrally of the bottom end 11*a* of the first casing 11 is a bore 14 in which a gas-charging adapter 13 is inserted, the adapter 13 being of internally threaded formation. The first casing 11 is formed with 14 by press molding, the casing being of generally cylindrical shape.

The second casing 12 is closed at one or bottom end 12*b* and open at the other or top end and has a downwardly tapered side wall defining therein a generally bowl-like or inverted dome chamber. The side wall includes an outwardly projected distal end 12*c* arranged for face-to-face engagement with the tip end 11*c* of the first casing 11, and an abutment 12*a* disposed interiorly of the distal end 12*c*. Formed centrally of the bottom end 12*b* of the second casing 12 is an aperture 16 to which is attached a coupler 15 engageable with a pneumatic or hydraulic device, not shown.

Like the first casing 11, the second casing 12 is formed with an aperture 16 by press molding, the second casing 12 being generally of bowl shape.

The diaphragm 17 is formed of flexible material and closed at one or bottom end and open at the other or tip end and constituted of a peripheral side wall in which a generally cylindrical chamber 22 is defined, the side wall being externally complementary in shape with the side walls of the first and second casings 11 and 12. Disposed circumferentially of the top end of the diaphragm 17 is a connector 18 on which a spring-acting ring 19 is fixedly mounted. The ring 19 maintains the connector 18 normally in a circular state.

The connector 18 is essentially greater in thickness than the side wall of the diaphragm 17 and provided with a bulged edge 18*a* disposed peripherally outwardly thereof. The bulged edge 18*a* has a maximum outside diameter larger than the inside diameter of the first casing 11 and thus serves as an interference when the diaphragm 17 is tightly fitted within the first casing 11. The interference is usually in the vicinity of 0.5 mm thick.

For assembly, the diaphragm 17 is first pressed softly into the first casing 11 so that the connector 18 is eventually urged to abut against the stepped portion 11*b* of the casing 11. Subsequently, the first casing 11 is roll molded on its circumference at a position where the bulged edge 18*a* of the connector 18 lies so as to define an inwardly directed projection 20, with the result that the connector 18 is brought into gripped or sandwiched interengagement between the projection 20 and the stepped portion 11*b* of the first casing 11 and is thus situated far removed from an integral joint 24 where the first and second casings 11 and 12 are joined together.

The first casing 11 having the diaphragm 17 so supported therein is finally joined with the second casing 12 at the integral joint 24 by welding means W. In such instance, the tip end 11*c* of the first casing 11 is in abutting engagement with the abutment 12*a* of the second casing 12.

With this arrangement, the diaphragm 17 is prevented from being adversely affected by heat exerted in welding the joint 24, that is, from deterioration or degradation. Furthermore, the specific interconnection of the diaphragm 17 with the first casing 11 does not require any complicated machining as is experienced with the prior art technique.

In actual use, the diaphragm chamber 22 is filled with a gas charged through the adapter 13 which may be closed with a blind plug such as a threaded bolt 21 at any suitable time.

This invention now being fully described, it is apparent to one of ordinary skill in the art that various changes and modifications may be made to the form and construction herein described and illustrated without departing from the spirit or scope of the appended claims.

What is claimed is:

1. An accumulator for pneumatic or hydraulic devices, comprising:

(a) a first generally cylindrical longitudinally extending casing having a closed end and an open end opposite the closed end, said first casing including a first peripheral side wall, said first peripheral side wall including (1) a stepped portion extending inwardly toward the longitudinally extending center axis of said first casing, disposed adjacent the closed end of said first casing, and (2) a perpendicular portion extending toward the open end of said first casing from said stepped portion, said perpendicular portion including a straight tip end at the open end of said first casing and a projection directed inwardly toward the center axis interconnected between said stepped portion and said perpendicular portion;

(b) a second casing having a closed end and an open end opposite the closed end, said second casing including a second peripheral side wall surrounding the center axis of said first casing tapered generally toward the center axis from the open end of said second casing to the closed end of said second casing, said second peripheral side wall including (1) a distal end at the open end of said second casing projected outwardly away from the center axis, and (2) an abutment extending inwardly from said distal end of said second casing toward the center axis in face-to-face engagement with said tip end of said first casing, said distal end of said second casing being welded to said tip end of said first casing; and (c) a diaphragm made of flexible material, having a closed end and an open end opposite the closed end, said diaphragm including (1) a third peripheral side wall interiorly defining a generally cylindrical chamber, and (2) a connector located peripherally of the open end of said diaphragm and gripped between said stepped portion of said first casing and said projection of said first casing so as to support said diaphragm in said first casing.

2. An accumulator according to claim 1, wherein said projection of said first casing is roll molded therein with said diaphragm connector abutting against said stepped portion of the first casing.

3. An accumulator according to claim 1, wherein said diaphragm is greater in thickness at said connector than at said third peripheral side wall.

4. An accumulator according to claim 1, wherein said diaphragm includes a spring-acting ring mounted peripherally of said connector.

5. An accumulator according to claim 1, wherein said diaphragm further includes a bulged portion disposed peripherally of said connector, and said bulged portion has a maximum outside diameter larger than the inside diameter of said first casing and serves as an interference, said interference being approximately 0.5 mm thick.

* * * * *